United States Patent [19]

Pauli

[11] Patent Number: 5,491,680

[45] Date of Patent: *Feb. 13, 1996

[54] OPTICAL TRACKING SYSTEM FOR POSITIONING A BEAM OF LIGHT

[75] Inventor: Giles A. Pauli, Austin, Tex.

[73] Assignee: Texas Instruments Incorporated, Dallas, Tex.

[ * ] Notice: The term of this patent shall not extend beyond the expiration date of Pat. No. 5,291,473.

[21] Appl. No.: 320,014

[22] Filed: Oct. 7, 1994

Related U.S. Application Data

[63] Continuation of Ser. No. 104,260, Aug. 9, 1993, abandoned, which is a continuation of Ser. No. 968,214, Oct. 29, 1992, abandoned, which is a continuation of Ser. No. 533,980, Jun. 6, 1990, abandoned.

[51] Int. Cl.⁶ ............................................. G11B 7/00
[52] U.S. Cl. ................................. 369/112; 369/124
[58] Field of Search .......................... 369/44.23, 44.17, 369/44.14, 112, 124, 120, 117, 121, 94; 359/95, 198, 199, 214, 221, 224, 855

[56] References Cited

U.S. PATENT DOCUMENTS

| 4,011,003 | 3/1977 | Dragt | 369/44.17 |
| 4,596,992 | 6/1986 | Hornbeck . | |
| 4,662,746 | 5/1987 | Hornbeck | 350/269 |
| 4,728,185 | 3/1988 | Thomas | 353/122 |
| 4,793,696 | 12/1988 | Suh | 369/44.23 |
| 5,291,473 | 3/1994 | Pauli | 369/112 |

FOREIGN PATENT DOCUMENTS

| 61-284169 | 12/1986 | Japan . | |
| 61-282817 | 12/1986 | Japan | 369/44.14 |
| 2175705 | 5/1985 | United Kingdom | G02B 1/02 |

OTHER PUBLICATIONS

Gregory, et al., "Optical Characteristics of a Deformable–Mirror Spatial Light Modulator", 13 *Optics Letters* 10, Jan., 1988.

Hornbeck, "128×128 Deformable Mirror Device", 30 *IEEE Transactions on Electron Devices* 539, May, 1983.

Fujitanu, "Optical Disk Technology", *Electronic Engineering*, Nov., 1983, at 53.

Ohr, "Magneto–Optic Combines Erasability and High Density Storage", *Electronic Design*, Jul. 11, 1985, at 93.

Laub, Zenith Radio Corporation, Chicago, Illinois, "Optics of Reflective Video Disk Players".

Bell, "Optical Data Storage Technology, Status and Prospects", *Computer Design*, Jan., 1983 at 133.

Collins, et al., "Optical Neurocomputers Implementation Using Deformable Mirrors Arrays", *IEEE First International Conf. on Neural Networks*, Jun. 1987.

Nelson and Hornbeck, Texas Instruments, Inc., Dallas, Tex., "Micromechanical Light Modulators for Electrophotographic Printers".

*Primary Examiner*—Georgia Y. Epps
*Assistant Examiner*—P. W. Huber
*Attorney, Agent, or Firm*—Thomas G. Eschweiler; James C. Kesterson; Richard L. Donaldson

[57] ABSTRACT

An optical tracking and positioning system is provided which comprises a beam source 14 which generates a beam which is transmitted through a splitter/filter 16. The beam issues from splitter/filter 16 and is selectively deflected to areas of an optical storage medium 12 by a mirror 18 which is controlled by a mirror control system 20. The beam is transmitted from mirror 18 through correction optics 22 and reflects off the surface of the optical storage medium 12. The beam returns along a coincident path and is separated by splitter/filter 16 and directed to a detector 24 which reads the data stored in optical storage medium 12. According to a preferred embodiment of the present invention, the mirror 18 comprises a deformable mirror device 26.

7 Claims, 1 Drawing Sheet

OPTICAL TRACKING SYSTEM FOR POSITIONING A BEAM OF LIGHT

This application is a continuation of application Ser. No. 08/104,260, filed Aug. 9, 1993, now abandoned, which is a continuation of application Ser. No. 07/968,214 filed Oct. 29, 1992, now abandoned, which is a continuation of 07/533,980 filed Jun. 6, 1990, now abandoned.

TECHNICAL FIELD OF THE INVENTION

This invention relates in general to the field of electronic systems and more particularly, the present invention relates to a method and apparatus for positioning a beam of light on a surface of an optical storage medium.

BACKGROUND OF THE INVENTION

The ability to efficiently store and retrieve data is an essential component of any integrated electronic system. In recent years, the development of optical storage systems has allowed greater storage densities than previously known. An important concern of any storage media, including optical storage media, is the time required to access the storage system to either store or retrieve data.

Optical storage media are currently used in a variety of forms. Optical disks, rectangular optical media, and optical tape are some of these forms. In each of these forms of optical storage media, a laser is used to write and read from the optical storage media. In general, the beam of light is directed from laser to the surface of the optical storage media where it is reflected. The reflected beam of light is routed to a detector which can read the data stored on the optical storage media responsive to the receipt of the reflected beam.

The methods and apparatus used to direct the beam of light to the appropriate section of the optical storage media are by far the slowest portion of the data storage and recovery system. For example, the typical optical storage disk drive available currently, Dave on the order of 35 to 100 millisecond access times and additionally a rotational latency of approximately 16 milliseconds. In comparison, the controllers associated with these systems are working with an overhead of approximately one milli-second. Accordingly, there is approximately a two order of magnitude difference between the mechanical access time of the optical storage drives and the remaining circuitry necessary to access data from the storage media. The primary reason for the slow nature of, for example, an optical storage disk drive, is the time required to mechanically position the optics which are used to direct the beam of light to and from the appropriate positions on the surface of the optical storage media. An additional factor increasing the access times of optical storage disk drives is the rotational latency of the disk, as it turns to bring the desired portion of the disk proximate the reading optics. Most current systems use a carriage assembly which holds various mirrors and optics and which is mechanically positioned over a section of the optical storage disk, for example. Data accessing must then wait for the optical disk to mechanically rotate to the desired section. The positioning of these carriage assemblies accounts for the first order term of the delay in accessing the optical storage media. The rotational latency accounts for the second order delay term.

Accordingly, a need has arisen for an optical tracking system which eliminates the need for the mechanical positioning of a carriage assembly and/or eliminating rotational latency and therefore reduces the time required to access the data stored in an optical storage media.

SUMMARY OF THE INVENTION

In accordance with the present invention, an optical tracking system is provided which substantially eliminates or reduces disadvantages and problems associated with prior art optical storage accessing systems. According to one embodiment of the present invention, an optical tracking system is provided which comprises a light beam source which is operable to generate a light beam for accessing an optical storage medium. A mirror is rotatable about an axis which is fixed a predetermined distance from the light beam source such that it may direct the light beam to various selectable points on the surface of the optical storage media.

According to another embodiment of the present invention, the mirror used to direct the beam to the optical storage media comprises a deformable mirror device. The deformable mirror device is operable linearly in an analog fashion. Accordingly, through the use of control signals, the spatial light modulator can be rotated to direct the beam at any selected portion of the surface of the optical storage media.

An important technical advantage of the present invention inheres in the fact that the mirror or deformable mirror device used to direct the beam to the appropriate position on the surface of the optical storage media is rotatably fixed a predetermined distance from the light beam source. Accordingly, there is no mechanical carriage assembly which must be positioned prior to the access of the data stored in the optical storage media.

A further technical advantage of the present invention inheres to the fact that the spatial light modulator used to direct the light beam may be constructured as a monolithic semiconductor device. Accordingly, efficient, reliable and inexpensive semiconductor production technology can be used to manufacture a small, lightweight, highly reflective the device.

An important technical advantage of deformable mirror devices is their small mechanical size and weight allowing quicker access as well as their superior reflective properties.

BRIEF DESCRIPTION OF THE DRAWINGS

A more complete understanding of the present invention may be acquired by referring to the detailed description and claims when considered in connection with the accompanying drawings in which like reference numbers indicate like features and wherein:

DETAILED DESCRIPTION OF THE INVENTION

Figure 1:
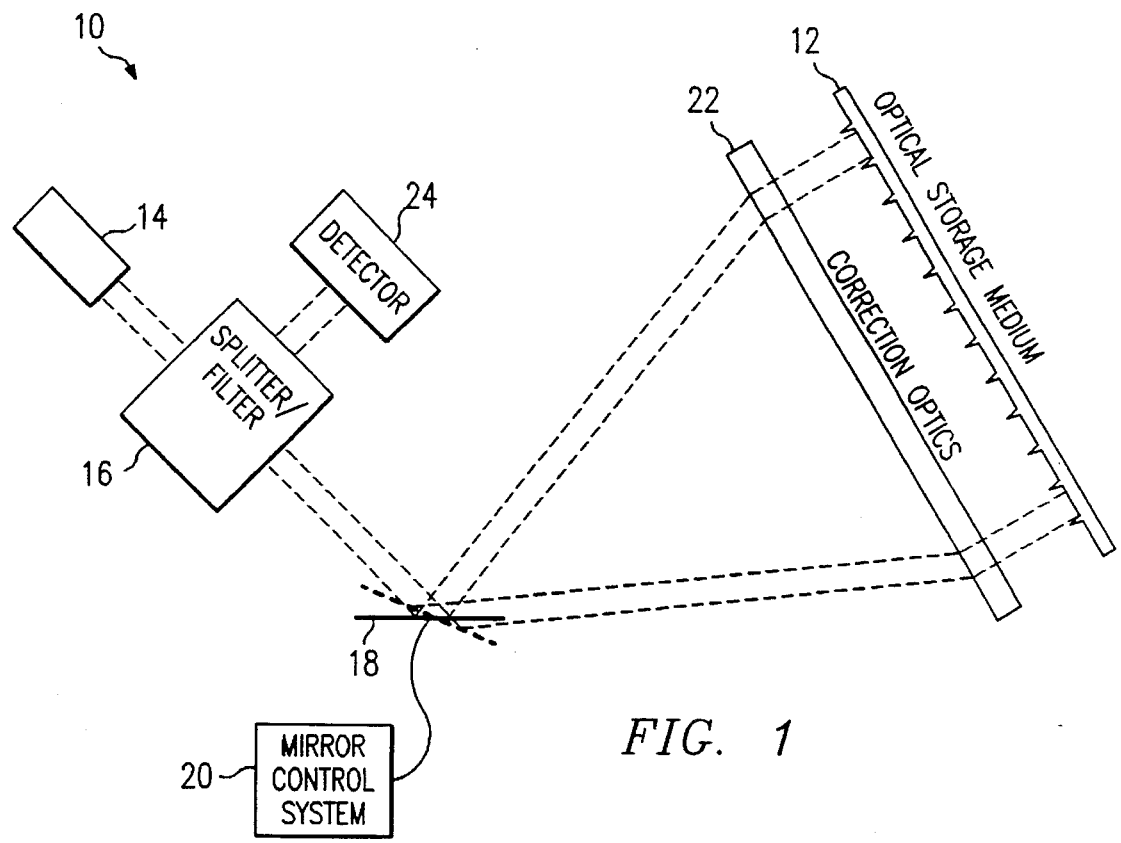
FIG. 1 is a schematic representation of an optical tracking system constructed according to the teachings of the present invention.

Referring to FIG. 1 an optical tracking system indicated generally at 10 is shown. Optical tracking system 10 is used to read and write data to an optical storage medium 12. Optical tracking system 10 includes a light beam source 14 which may comprise, for example, a laser. Light beam source 14 generates a beam of light which passes through a beam splitter/filter 16. The beam of light issues from beam splitter/filter 16 and impinges on a mirror 18. Mirror 18 is fixed at a predetermined distance from light beam source 14 and is rotatable around a torsion axis passing through mirror 18 such that the beam impinging on mirror 18 can be selectively reflected in a predetermined range of directions. The rotation of mirror 18 is controlled by a mirror control system 20 coupled to mirror 18.

In the preferred embodiment of the present invention, mirror 18 comprises a deformable mirror device. In the preferred embodiment, mirror 18 may comprise in the preferred embodiment, a monolithic device formed in a semiconductor substrate using conventional semiconductor techniques to provide an inexpensive, reliable and efficient controllable reflector. The structure and operation of mirror 18 will be described more fully with reference to FIG. 2.

The beam is reflected from mirror 18 through a system of correction optics 22 to the surface of optical storage medium 12. According to the well-known operation of optical storage techniques, the beam is reflected off of the surface of the storage medium 12 and returned along its impinging path through correction optics 22. The beam returns along its impinging path from corrections optics 22 and reflects off of mirror 18 into splitter/filter 16. At this point, the returning reflected beam is separated from the impinging beam by splitter/filter 16 and is routed into a detector 24 according to known methods. The detector 24 is able to read the data stored in optical storage medium 12 responsive to the receipt of the reflected beam received from splitter/filter 16.

A deformable mirror device such as one which may be used as mirror 18 in accordance with the teachings of the present invention has been applied in a variety of contexts including, for example, a printer. A complete description of the operation of a deformable mirror device such as might be used for mirror 18 in the present invention can be found in U.S. Pat. No. 4,596,992 issued to Larry J. Hornbeck for a linear spatial light modulator and printer, the disclosure of which is hereby incorporated by reference.

Figure 2:
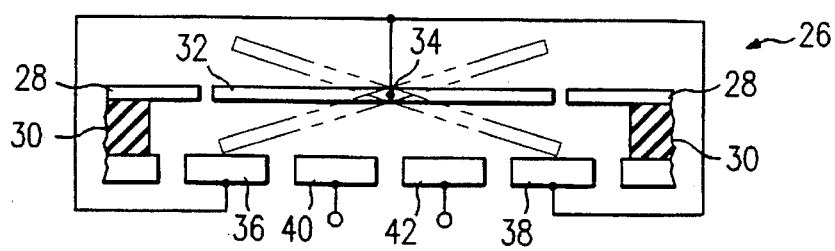
FIG. 2 is a schematic cross-sectional diagram of a spatial light modulator device which might be used in conjunction with the present invention.

FIG. 2 is a cross-sectional schematic diagram of a deformable mirror device which could be used for mirror 18 in the present invention. FIG. 2 illustrates a deformable mirror device indicated generally at 26. The deformable mirror device 26 may be fabricated using known methods over a semiconductor substrate which itself can incorporate an integrated CMOS address structure functioning as a portion of mirror control system 20. As shown in FIG. 2, deformable mirror device 26 comprises an outer aluminum alloy layer 28 separated from the underlying CMOS address structure by a sacrificial spacer layer 30. A portion of the outer aluminum alloy layer 28 is defined by a metal etch step to form a torsion beam 32. A tension rod 34 is formed passing through torsion beam 32 and connecting it to the remainder of the outer layer 28. The cross section shown in FIG. 2 is perpendicular to the long axis of torsion rod 34. After the torsion beam 32 has been defined by the metal etch step, the spacing material in layer 30 is removed beneath the torsion beam 32 using an isotropic plasma etching step to form an air gap capacitor between the torsion beam 32 and the underlying address structure. The underlying address structure comprises a first landing electrode 36 and a second landing electrode 38 and first and second address electrodes 40 and 42 as shown in FIG. 2.

In operation, signals may be placed on first and second address electrodes 40 or 42 to rotate the torsion beam 32 about the torsion rod 34. By placing appropriate signals on address electrodes 40 and 42, the torsion beam 32 can be maintained at any preselected degree of rotation until the ends of the torsion beam 32 nearly contact the landing electrodes 36 and 38. For example, a voltage can be placed on address electrode 42 tending to attract torsion beam 32 causing torsion beam 32 to rotate in a clockwise direction. A second voltage may simultaneously be placed on address electrode 40 to either repel or attract torsion beam 32 to, respectively, initiate a clockwise rotation and subsequently stabilize the position of torsion beam 32 during rotation and after it has rotated the desired amount. Similar signals may be used to achieve a counter-clockwise rotation of torsion beam 32. Conventional signal processing techniques can be used to generate the required voltages and timing of the signals to be placed on address electrodes 40 and 42.

Using known methods, a deformable mirror device such as deformable mirror device 26 can be constructed to have a maximum deflection of the torsion beam 32 of plus or minus 9 degrees from horizontal. The torsion beam can respond to voltages placed on address electrodes 40 or 42 in approximately 12 microseconds, representing a substantial improvement over the approximately 43 to 117 millisecond cumulative response times common in the present tracking and positioning systems available. The aluminum alloy used to manufacture torsion beam 32 provides a superior mirror surface to prevent any distortion of the beam received from splitter/filter 16 and generated by beam source 14. Further, the small area occupied by and mass of torsion beam 32 allows for extremely quick reaction time and equally rapid access time to the data stored in optical storage medium 12. For example, a typical size for torsion beam 32 would be on the order of approximately 0.55 square mils. The use of such micromechanical structures provides a optical tracking system which does not require the movement of the large masses involved in prior carriage assemblies.

Although the present invention has been described in detail, it should be understood the various changes, substitutions and alterations can be made hereto without departing from the spirit and scope of the invention as defined by the appended claims. For example, although the invention has been described with reference to track to track positioning, the present invention is equally applicable to accessing the data within a track after the beam has been positioned on the track by other means. This could be used, for example, in an embodiment using a rectangular optical storage medium. A deformable mirror device can be used to move the beam along a selected track after the beam has been positioned within the track by other methods, such as a mechanical carriage assembly or an additional deformable mirror device or conventional mirror. This and other embodiments are intended to be included within the scope of the present invention.

What is claimed is:

1. A method of accessing data positions on an optical storage medium comprising the steps of:

generating a beam of light from a light source;

rotating a mirror about an axis freed a predetermined distance from the light source in the path of the beam of light a predetermined distance from the light source to direct the beam of light to a selected portion of the optical storage medium, wherein the mirror comprises:

a torsion rod fixed with respect to a semiconductor substrate, thereby forming the axis;

a torsion beam pivotally connected to the torsion rod; and an electrode connected to the semiconductor substrate to provide an electrostatic force to the torsion beam;

controlling the rotation of the mirror with an electrical mirror control system, wherein the mirror is directly responsive to the electrostatic force that is resultant from electrical control signals from the electrical mirror control system;

detecting the beam reflected from the optical storage medium; and reading data stored in the selected portion of the optical storage medium responsive to said detection of the reflected beam.

2. An optical tracking system for positioning a beam of light on an optical storage medium, comprising:

a light source operable to generate the beam;

a mirror rotatable about an axis fixed a predetermined distance from said light source and operable to selectively deflect the beam toward a plurality of selected positions on the surface of the optical storage medium, the optical storage medium operable to reflect the beam to generate a reflected beam, wherein the mirror comprises:

a torsion rod fixed with respect to a semiconductor substrate, thereby forming the axis;

a torsion beam pivotally connected to the torsion rod; and an electrode connected to the semiconductor substrate to provide an electrostatic force to the torsion beam;

an electrical mirror control system coupled to said mirror and operable to control the rotation of said mirror, wherein the mirror is directly responsive to the electrostatic force that is resultant from electrical control signals from the electrical mirror control system such that the beam may be directed toward an plurality of selectable positions on the surface of the optical storage medium to access said plurality of positions;

a detector disposed in the path of the reflected beam operable to read data stored by the optical medium responsive to the reflected beam, the reflected beam and the impinging beam having substantially coincident paths; and a beam splitter disposed in the coincident paths and operable to direct the reflected beam to said detector.

3. The system of claim 2 wherein said optical storage medium comprises a plurality of tracks, each track comprising a plurality of data storage positions, and wherein said mirror control system and said deformable mirror device are operable to select any of said plurality of tracks and wherein the system further comprises:

an optical storage medium movement system operable to move said optical storage medium such that data positions within a selected track may be sequentially accessed by the beam.

4. The optical tracking storage system of claim 2 wherein the electrical control signal received by the mirror device are analog control signals.

5. The optical tracking storage system of claim 2 wherein the mirror device responds to the electrical control signal in a linear fashion.

6. An optical tracking storage system for positioning a beam of light on an optical storage medium, comprising:

a light source operable to generate the beam;

a mirror rotatable about an axis fixed a predetermined distance from said light source and operable to selectively deflect the beam toward a plurality of selected portions of the optical storage medium, wherein the mirror comprises:

a torsion rod fixed with respect to a semiconductor substrate, thereby forming the axis;

a torsion beam pivotally connected to the torsion rod; and an electrode connected to the semiconductor substrate to provide an electrostatic force to the torsion beam; and an electrical mirror control system connected to the mirror;

wherein the mirror is directly responsive to the electrostatic force theft is resultant from an electrical control signal from the electrical mirror control system such that the beam may be directed toward a plurality of selectable portions of an optical storage medium to access a plurality of data storage positions resident in said selected portions and wherein the beam comprises an impinging beam and where the impinging beam is reflected by the surface of the optical medium to create a reflected beam and further comprising:

a detector disposed in the path of the reflected beam operable to read data stored by the optical medium responsive to the reflected beam.

7. The system of claim 6 wherein the reflected beam and the impinging beam have a substantially coincident path and further comprising:

a beam splitter disposed in the coincident path and operable to direct the reflected beam to said detector.

* * * * *